(12) United States Patent
Lin

(10) Patent No.: US 8,242,656 B1
(45) Date of Patent: Aug. 14, 2012

(54) MOTOR

(76) Inventor: Yu-Ming Lin, Sanchong (TW)

( * ) Notice: Subject to any disclaimer, the term of this patent is extended or adjusted under 35 U.S.C. 154(b) by 287 days.

(21) Appl. No.: 12/814,353

(22) Filed: Jun. 11, 2010

(51) Int. Cl.
*H02K 3/46* (2006.01)

(52) U.S. Cl. ............. 310/194; 310/260; 310/71; 310/90

(58) Field of Classification Search .................. 310/260, 310/216.001, 216.105, 43, 194, 402, 405, 310/411, 425, 90
See application file for complete search history.

(56) References Cited

U.S. PATENT DOCUMENTS

| | | | | |
|---|---|---|---|---|
| 3,717,779 | A * | 2/1973 | Hallerback | 310/91 |
| 3,720,914 | A * | 3/1973 | Hallerback | 310/43 |
| 3,827,141 | A * | 8/1974 | Hallerback | 29/596 |
| 3,873,861 | A * | 3/1975 | Halm | 310/43 |
| 6,127,760 | A * | 10/2000 | Nagasaki et al. | 310/216.074 |
| 6,333,579 | B1 * | 12/2001 | Hirano et al. | 310/194 |
| 6,924,570 | B2 * | 8/2005 | De Filippis et al. | 310/71 |
| 6,992,417 | B1 * | 1/2006 | Yamada | 310/194 |
| 7,271,512 | B2 * | 9/2007 | Lee et al. | 310/43 |
| 7,385,323 | B2 * | 6/2008 | Takahashi et al. | 310/71 |

* cited by examiner

*Primary Examiner* — Dang Le
(74) *Attorney, Agent, or Firm* — Pro-Techtor Int'l Services

(57) ABSTRACT

The present invention discloses a motor. A rotor and bearings are installed first and then copper wires are wrapped by a machine. Therefore, the copper wires wrapped are denser and thinner that a space filling factor is improved and an entire size of the motor is reduced. In addition to saving of electricity consumption and improvement of motor performance, the bearings are directly enclosed in two insulation plates to isolate from ambient environment, so that dust contamination can be reduced and noise from operation can be decreased, thereby extending a service life of the motor. Furthermore, packing and transportation costs can be even saved. Additionally, the insulation plates include plural insertion slots for insertion with copper plates which are electrically connected with a motor power cord. Thus, an inner stator can be connected with the power cord by plugging, so as to save labor work and time.

4 Claims, 6 Drawing Sheets

MOTOR

BACKGROUND OF THE INVENTION a) Field of the Invention

The present invention relates to a motor and more particularly to a motor which is small in size, has a lower cost and is without much noise that in addition to a saving of electricity consumption and improvement of motor performance, packing and transportation costs can be saved. Furthermore, manpower and time can be saved in a manufacturing process.

b) Description of the Prior Art

Referring to FIG. 1, for a conventional motor, through-holes 101 on an inner stator 100 which is made of a silicon steel sheet are first inserted with grooved insulators 200 which is made of plastic, and an entire bundle of copper wires A is wire-wrapped and then lead in manually, with the copper wires A penetrating into the through-holes 101 of the inner stator 100. A plastic grooved wedge (not shown in the drawing) is latched in next, and the copper wires A are fastened with a rope B and then shaped. Then, the copper wires A are processed with varnish for forming. After the copper wires A have been positioned, a rotor 300 is installed, with an upper and lower end of the rotor 300 being then sheathed with bearings 400; finally, the bearings 400 are covered with metallic casings 500 for assembling and forming. Bearing slots 501 at inner rims of the casings 500 can provide for emplacing the bearings 400. The conventional motor is provided with several shortcomings, as listed below:

1. The copper wires A must be transfixed and formed manually; therefore, manpower and materials are wasted.
2. A height of the motor cannot be reduced and its entire size cannot be diminished; therefore, when operating, the motor is not very stable and consumes a lot of electricity. In addition, noise is loud, efficiency cannot be improved and packing and transportation costs cannot be reduced.
3. As the bearings 400 at the upper and lower ends of the motor rotor 300 must be enclosed by the metallic casings 500 at the upper and lower ends, the costs cannot be reduced.
4. To form after the copper wires A have been fastened, the varnish has to be used; therefore, the conventional motor is not environmentally friendly.
5. When the copper wires A are electrically connected with a power cord (not shown in the drawing), a Polyamide insulator has to be peeled off, which wastes labor work and time in the manufacturing process.

SUMMARY OF THE INVENTION

Accordingly, the primary object of the present invention is to provide a motor, wherein the metallic casings of a conventional motor are omitted and this new motor is assembled by wrapping the copper wires mechanically that in addition to a reduced size and lower costs, electricity consumption can be saved and performance of the motor can be improved.

Another object of the present invention is to provide a motor, wherein bearings are directly enclosed in insulation end plates to isolate from dusts in ambient environment that in addition to lowering noise, a service life of the motor can be even extended.

Still another object of the present invention is to provide a motor, wherein copper wires on a coil of an inner stator are electrically connected with a power cord by plugging; therefore, time and labor work can be saved in the manufacturing process.

To enable a further understanding of the said objectives and the technological methods of the invention herein, the brief description of the drawings below is followed by the detailed description of the preferred embodiments.

BRIEF DESCRIPTION OF THE DRAWINGS

FIGS. 4-1 shows a partially enlarged view of FIG. 4, according to the present invention.

DETAILED DESCRIPTION OF THE PREFERRED EMBODIMENTS

Figure 2:
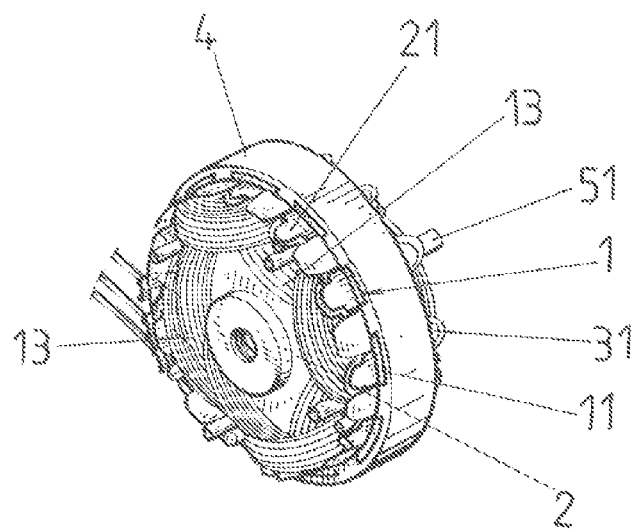
FIG. 2 shows a perspective view of the present invention.
Figure 3:
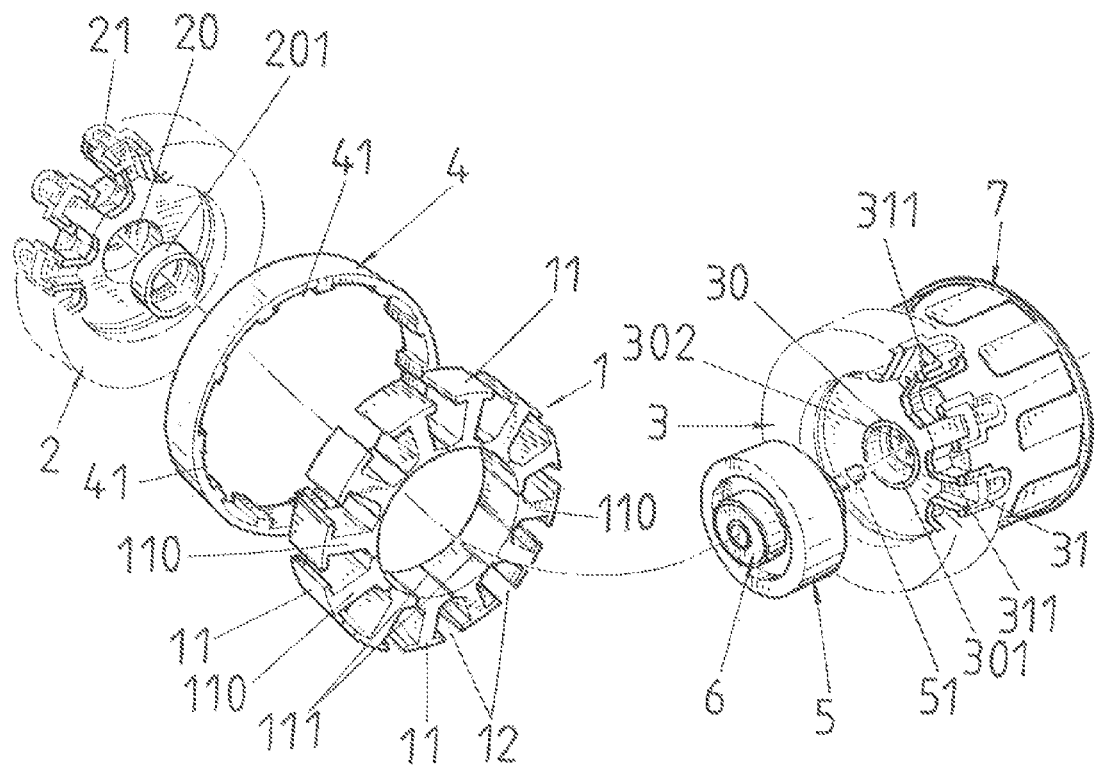
FIG. 3 shows an exploded view of the present invention.

Referring to FIGS. 2 and 3, the present invention comprises an inner stator 1, two insulation plates 2, 3, an outer frame 4, a rotor 5 and two bearings 6, wherein an outer rim of the annular-shaped inner stator 1 is extended with plural T-shaped blocks 11, with a U-shaped wire slot 12 being formed between two neighboring T-shaped blocks 11. The wire slots 12 are provided with a coil 13 of a thickness, with the coil 13 being formed by stacking several copper wires through a wire wrapping machine. An exterior ring of the inner stator 1 is sheathed with the outer frame 4, two sides of which are two insulation plates 2, 3 respectively. Plural wedge-shaped latch slots 41 at an inner ring of the outer frame 4 provide for latching the plural T-shaped blocks 11 of the inner stator 1. Two sides of a shaft 51 in a center of the rotor 5 are provided respectively with the bearing 6, circular slots 20, 30 at inner sides in centers of the insulation plates 2, 3 provide respectively for latching spindle sleeves 201, 301, two bearings 6 are put into the spindle sleeves 201, 301 respectively, and the shaft 51 at one end of the rotor 5 is protruded by penetrating into a bore 302 in a center of the insulation plate 3; whereas the two bearings 6 are enclosed in the two insulation plates 2, 3, plural T-shaped plates 21, 31 are located at exterior rings of the two insulation plates 2, 3 respectively, latch slots 311 at inner sides of the T-shaped plates 21, 31 are sheathed on brackets 110 of the T-shaped blocks 11 of the inner stator 1 and the two insulation plates 2, 3 are assembled on the inner stator 1. Referring to FIG. 3, an exterior side of one insulation plate 3 can be latched with an outer housing 7.

Figure 1:
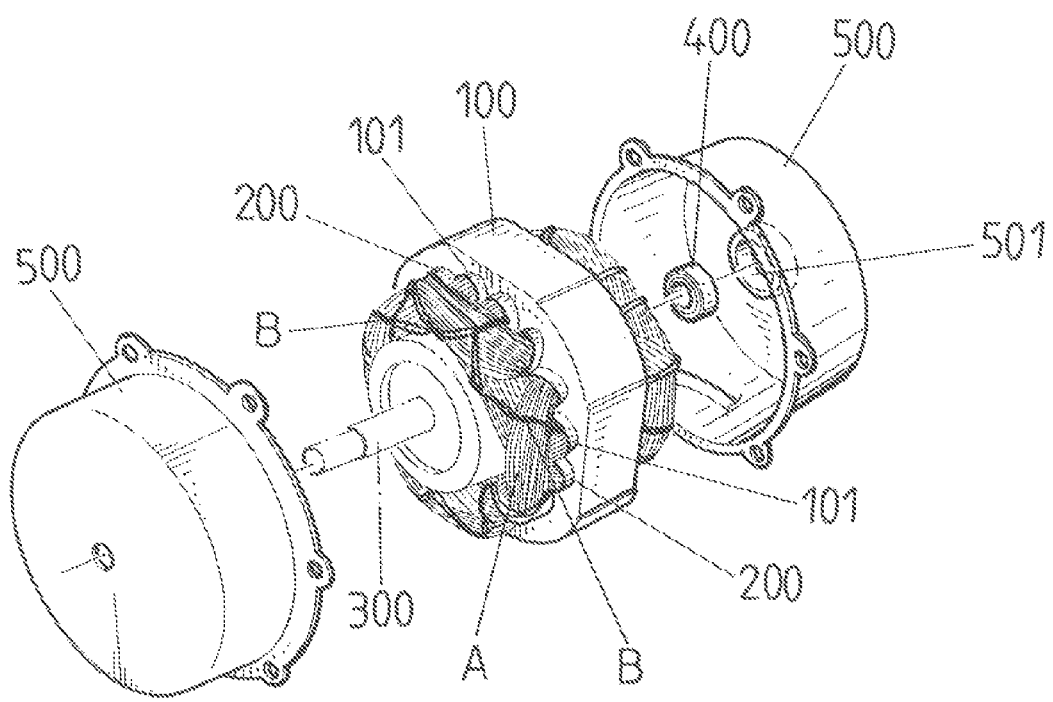
FIG. 1 shows an exploded view of a conventional motor.
Figure 4:
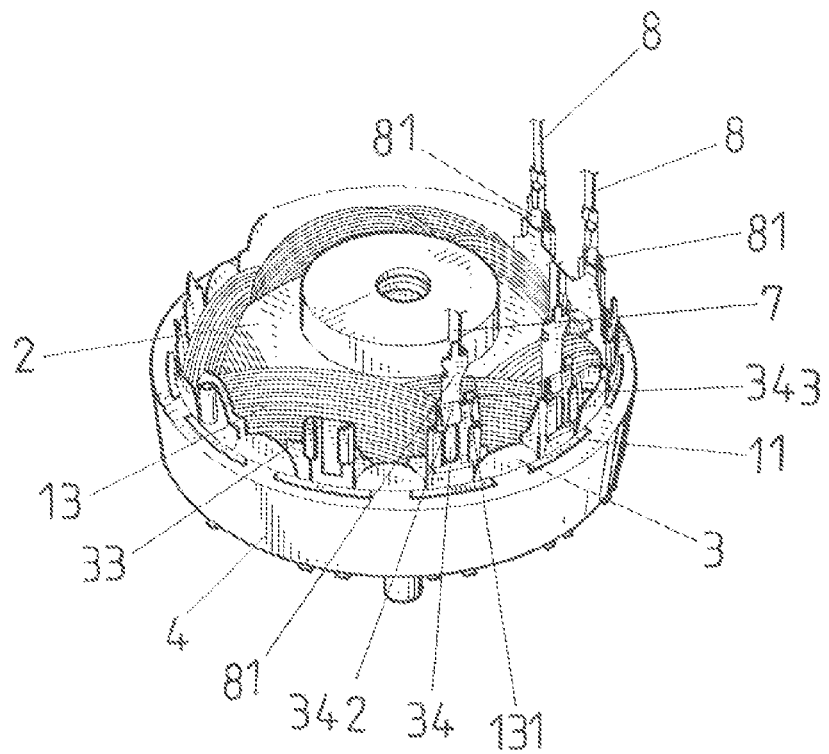
FIG. 4 shows a structural view of the present invention.
Figures 1, 4:
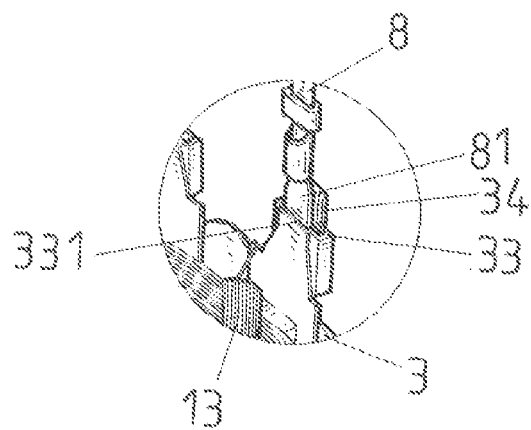
Figure 5:
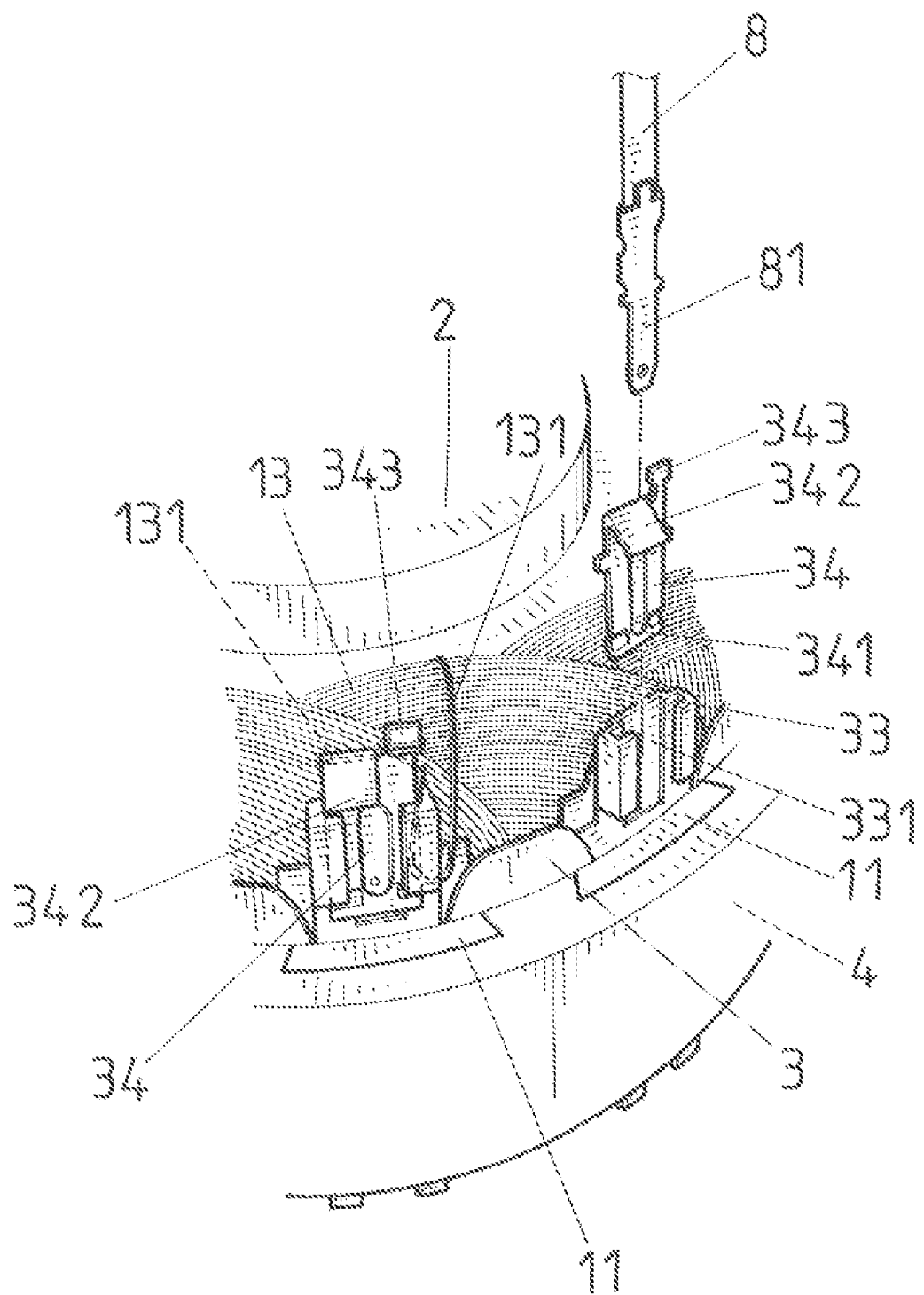
FIG. 5 shows a partially exploded enlarged view of the present invention.

Referring to FIGS. 4 and 5, plural insertion slots 33 are provided on the insulation plate 3, each insertion slot 33 provides for insertion with a copper plate 34, a lower end of the copper plate 34 is provided with a tilted block 341 which is stably inserted at a bottom of the insertion slot 33 and a top end of the copper plate 34 is provided with a flap 342 and a wrapping post 343. When a single copper wire 131 in the coil 13 is hooked at a bended place of the flap 342 by wrapping around the wrapping post 343 of the copper plate 34 through the insertion slot 33 of the insulation plate 3 and when the flap 342 is hot pressed as a flat-shaped plate through a hot press machine, a Polyamide insulator at an outer layer of the copper wire 131 can be peeled off to achieve electrical connection. In addition, when a plug 81 at one end of a motor power cord 8 is inserted into an insertion hole 331 (as shown in FIGS. 4-1) at an inner side of the insertion slot 33 of the insulation plate 3, the plug 81 can be electrically connected with the copper plate 34.

Referring to FIG. 3, inner rims of the T-shaped blocks 11 of the inner stator 11 are provided with plural through-holes 111 which are lined up at the inner rims of the T-shaped blocks 11 to increase a rotation speed of the motor.

Figure 6:
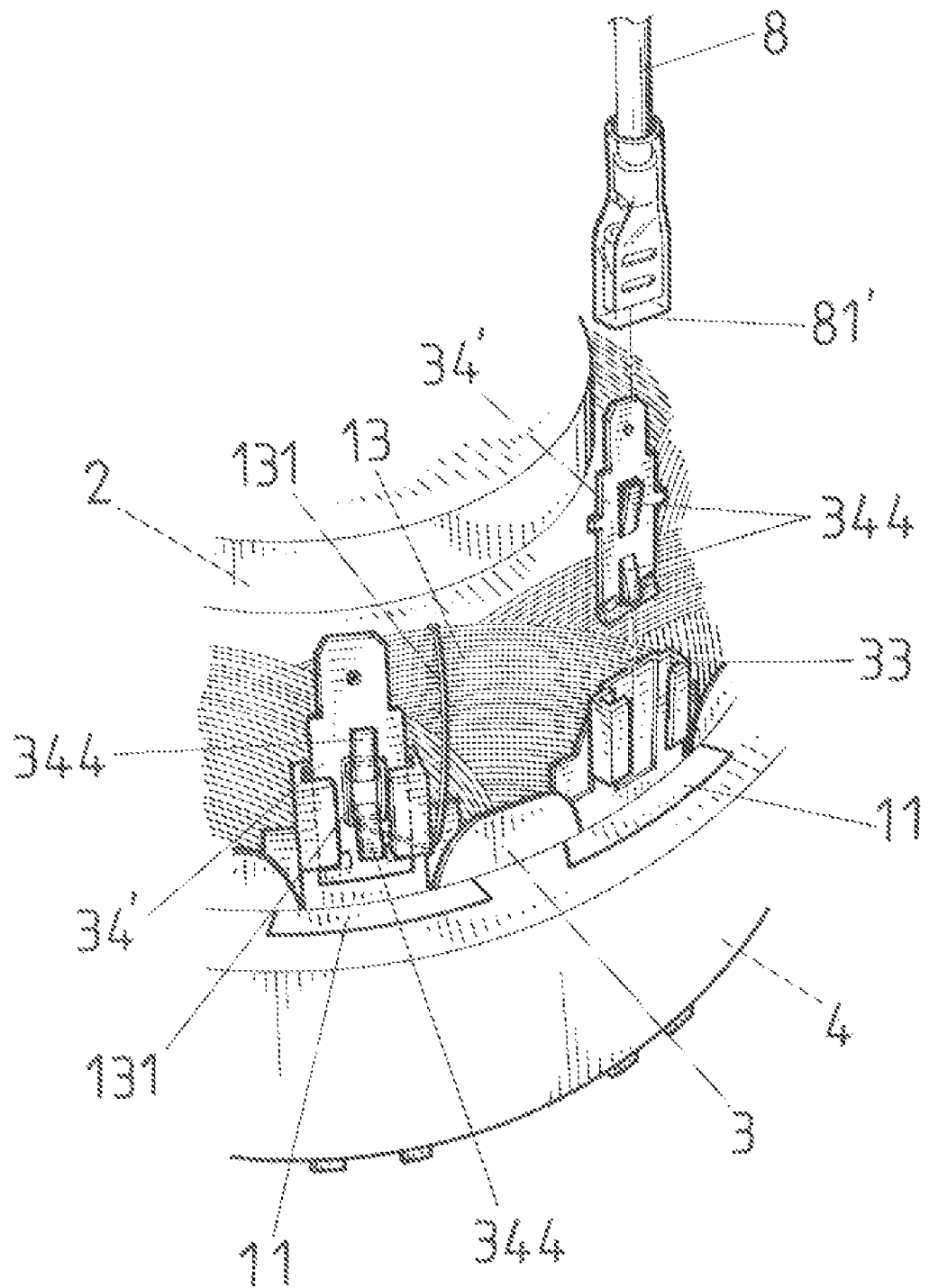
FIG. 6 shows a partially exploded enlarged view of an embodiment of copper plates, according to the present invention.

Referring to FIG. 6, it shows a schematic view of an embodiment of copper plates of the present invention, wherein a copper plate 34' is provided with two tilted plates 344 in opposite directions. When the copper wires 131 are wrapped at bended places of the two tilted plates 344, the Polyamide insulators at the outer layers of the copper wires 131 can be peeled off to electrically connect with the copper plates 34'. The copper plate 34' can provide for sheathing a female socket 81' at one end of the motor power cord 8, such that the motor power core 8 can be electrically connect with the copper plate 34'.

Figure 7:
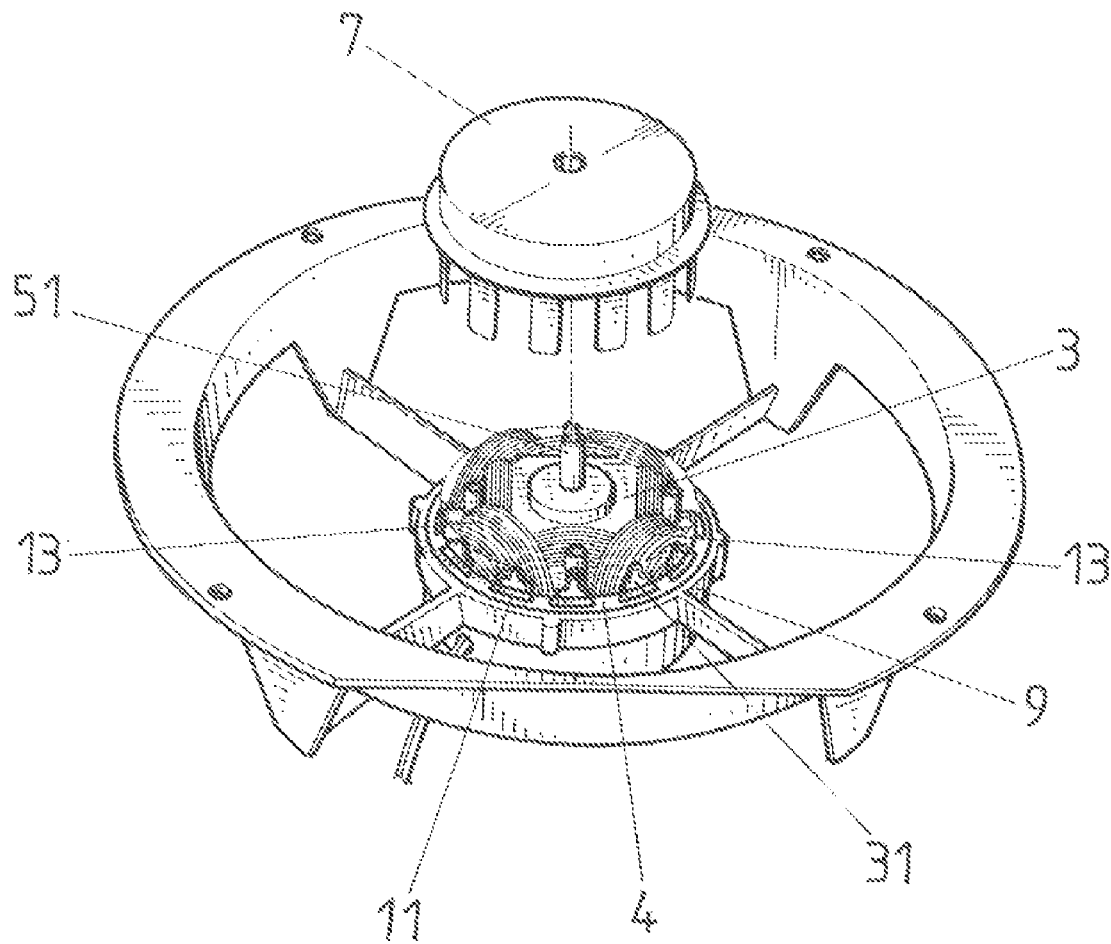
FIG. 7 shows a schematic view of an embodiment of the present invention which is installed on a fan.

Referring to FIG. 7, it shows a schematic view of an embodiment of the present invention which is installed on a fan 9.

In summary, the present invention relates to a motor, wherein the casings of a conventional motor are omitted, the rotor and the bearings are installed first and then the wire-wrapping is performed mechanically. As the copper wires wrapped are denser and thinner, the entire size is reduced. Therefore, the costs are reduced, the electricity consumption can be saved and the efficiency of the motor can be improved. On the other hand, the bearings are enclosed in the insulation plates to isolate from the ambient environment; therefore, the noise is reduced and the service life of the motor is even extended.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A motor comprising:
an inner stator, an outer rim of which is connected to plural T-shaped blocks with brackets, with a U-shaped wire slot being formed between two neighboring T-shaped blocks to provide for wrapping a coil stacked by copper wires;
two insulation plates, exterior rings of which are provided respectively with plural T-shaped plates, with a latch slot at an inner side of the T-shaped plate being sheathed on the bracket of the T-shaped block of the inner stator, a circular slot at an inner side in a center of the insulation plate providing for latching a spindle sleeve, a center of the circular slot being provided with a bore, the insulation plate being provided with plural insertion slots for insertion with copper plates and the copper plates being electrically connected with a motor power cord;
an outer frame which is sheathed on the inner stator and an inner ring of which is provided with latch slots for latching the T-shaped blocks of the inner stator;
a rotor which is emplaced inside the inner stator and a shaft in a center of which is protruded by penetrating into the bore of one insulation plate; and
two bearings which are sheathed on the shaft of the rotor and are emplaced respectively in the spindle sleeves of two insulation plates.

2. The motor according to claim 1, wherein a lower end of the copper plate which is inserted in the insertion slot of the insulation plate is provided with a tilted block and a top end of the copper plate is provided with a flap and a wrapping post, with that the copper wire is hooked at a bended place of the flap after wrapping around the wrapping post for electrical connection.

3. The motor according to claim 1, wherein inner rims of the T-shaped blocks of the inner stator are provided with plural through-holes.

4. The motor according to claim 1, wherein an exterior side of one insulation plate is latched with an outer housing.

\* \* \* \* \*